(12) United States Patent
Lin et al.

(10) Patent No.: US 6,999,236 B2
(45) Date of Patent: Feb. 14, 2006

(54) OPTICAL-INTERFERENCE TYPE REFLECTIVE PANEL AND METHOD FOR MAKING THE SAME

(75) Inventors: Wen-Jian Lin, Hsinchu (TW); Hsiung-Kuang Tsai, Taipei (TW)

(73) Assignee: Prime View International Co., Ltd., Hsinchu (TW)

( * ) Notice: Subject to any disclaimer, the term of this patent is extended or adjusted under 35 U.S.C. 154(b) by 113 days.

(21) Appl. No.: 10/752,811

(22) Filed: Jan. 8, 2004

(65) Prior Publication Data
US 2004/0145811 A1    Jul. 29, 2004

(30) Foreign Application Priority Data
Jan. 29, 2003   (TW) .............................. 92101977 A

(51) Int. Cl.
*G02B 1/10* (2006.01)

(52) U.S. Cl. ...................................... 359/585; 349/105

(58) Field of Classification Search ................ 359/578, 359/580, 582, 584, 585, 587, 589; 349/105
See application file for complete search history.

(56) References Cited

U.S. PATENT DOCUMENTS 5,550,373 A * 8/1996 Cole et al. ................ 250/338.1
6,088,162 A * 7/2000 Someno ...................... 359/580
6,490,091 B1 * 12/2002 Woodruff et al. ........... 359/585

* cited by examiner

*Primary Examiner*—Mark A. Robinson
*Assistant Examiner*—Alessandro Amari
(74) *Attorney, Agent, or Firm*—Bacon & Thomas, PLLC

(57) ABSTRACT

An optical-interference type reflective panel and a method for making the same are disclosed, wherein the display panel has a substrate on which multiple supporting layers are firstly formed. Then, a plurality of first conductive optical film stacks, spacing layers and multiple second conductive optical film stacks are sequentially formed on the substrate. Finally, once the spacing layers are removed, optical-interference regulators are formed. Since said supporting layers forming step is prior to the first conductive optical film stacks, a precise back-side exposing step is not necessary so that the making procedure of the panel is simplified.

4 Claims, 8 Drawing Sheets

OPTICAL-INTERFERENCE TYPE REFLECTIVE PANEL AND METHOD FOR MAKING THE SAME

BACKGROUND OF THE INVENTION

1. Field of the Invention

The present invention relates to an optical-interference type reflective panel and a method for making the same, and more particularly to a reflective panel for which a supporting layer forming step is prior to a first conductive optical film stack forming step so as to simplify the manufacturing process of the reflective panel.

2. Description of Related Art

In order to minimize the bulky size of a computer display, the flat display was developed to replace the conventional CRT display. For example, the most well known flat display is the LCD. In recent years, different kinds of LCDs have been developed by display manufacturers. Most of these manufacturers are dedicated as far as possible to reduce the power consumption of the display so that the LCD will become more suitable for portable electronic products such as cell phones, PDAs and E-books.

Inside the LCD device, the back light module consumes the most power of all the elements. To solve the problem, a reflective type panel is developed, which utilizes the external light as the light source to replace the back light module.

Whether for the conventional LCD panel or the reflective type panel, a color filtering film and a polarizing film are constructed in the panel so as to display the color images and control the direction of the light. Even though these thin films are pervious to light, a partial amount of light may be blocked or lost while light passes through these films. To overcome the light loss problem, another reflective type panel called an optical-interference panel has accordingly been developed. Based on the interference phenomenon caused when light passes through different thin films, the aforementioned optical-interference panel is able to generate the fundamental red, blue and green colors by properly creating the thin film elements. Thus, the panel is able to show color images without the use of said color filter thin film and polarizing thin film, meanwhile the light transmittance of the panel is also improved so the panel is much more suitable to be applied to the portable electronic products.

With reference to FIG. 3, a single optical-interference regulator in the aforementioned optical-interference panel includes a substrate (70), a first conductive optical film stack (71) and a supporting layer (72) formed on the substrate (70). A second conductive optical film stack (73) (also called amechanical layer) partly covers the adjacent supporting layers (72), whereby a gap is defined between the first and second conductive optical film stacks (71, 73).

When supplying an electrical field between the two conductive optical film stacks (71, 73) by an external driving circuit (not shown), the second conductive optical film stack (73) will be slightly deformed and becomes closer to the first conductive optical film stack (71). With the different gap distances between the two conductive optical film stacks (71,73), light beams passing through the panel will have different extents of interference, so that the panel is able to show different colors.

However, the fabricating process of the conventional panel is quite complex. With reference to FIGS. 4A and 4B, the first conductive optical film stack (71) and a spacing layer (701) are sequentially formed on the substrate (70) by well known film deposition, photolithography, film etching steps etc.

A negative photo-resist layer (not shown) is then applied on the surfaces of the first conductive optical film stack (71) and the spacing layer (701). With the steps of back-side exposing and photolithography, parts of the first conductive optical film stack (71) are removed from the substrate (70). The exposed regions of the substrate (70) are provided to form multiple supporting layers (72) thereon as shown in FIG. 4C.

With reference to FIG. 4D, the second conductive optical film stack (73) is formed on all supporting layers (72) and the spacing layer (701). In FIG. 4D, after removing the spacing layer (701) from the substrate (70), a gap is accordingly defined between the first and the second conductive optical film stacks (71)(73).

In the foregoing processes, since the first conductive optical film stack (71) is formed on the substrate (70) prior to the supporting layers (72), a precise self-alignment process (back-side exposing) is involved when applying the negative photo-resist layer on the first conductive optical film stack (71) and the spacing layer (701). Thus, the entire panel manufacturing process is particularly complex.

To mitigate and/or obviate the aforementioned problem, the present invention provides a novel optical-interference type reflective panel and a method for making the same.

SUMMARY OF THE INVENTION

One objective of the present invention is to provide an optical-interference type reflective panel and a method for making the same, wherein the manufacturing procedure for the panel is simplified.

To accomplish the objective, the method has the steps of:

providing a substrate;

sequentially forming a plurality of supporting layers, first conductive optical film stacks, a spacing layer and a plurality of second conductive optical film stacks on the substrate; and removing the spacing layer from the substrate to form optical-interference regulators on the substrate.

Because said supporting layers forming step is prior to the first conductive optical film stacks, a precise back-side exposing step is not necessary so that the fabricating procedure of the panel is simplified.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1A to 1E, a manufacturing process of an optical interference panel in accordance with the present invention is disclosed. The process includes the following steps.

Figure 1A:
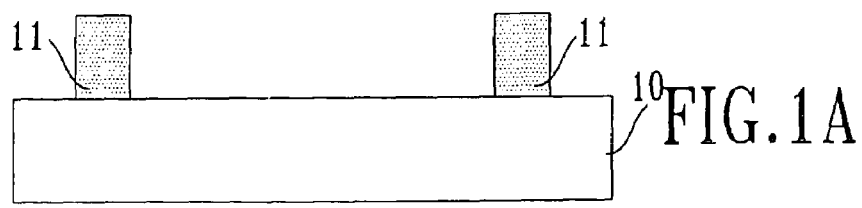
FIGS. 1A–1E show a manufacturing process of an optical interference panel in accordance with the present invention.

As shown in FIG. 1A, a plurality of the supporting layers (11) is formed on a substrate (10) that is composed of glass or macromolecule material.

Figure 1B:
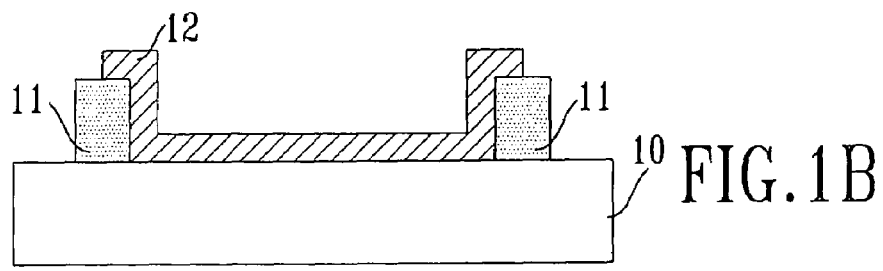

In FIG. 1B, a first conductive optical film stack (12) is then formed on the substrate (10) and between adjacent supporting layers (11), wherein the first conductive optical film stack (12) also covers a partial surface of the adjacent supporting layers (11).

Figure 1C:
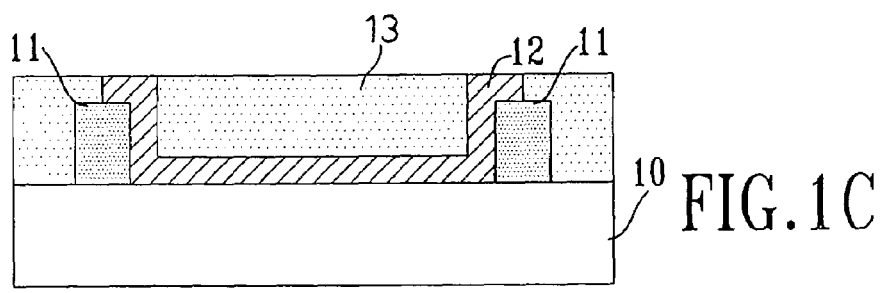

With reference to FIG. 1C, a spacing layer (13), which is also called a sacrificing layer, is applied on the entire substrate (10) and flattened.

Figure 1D:
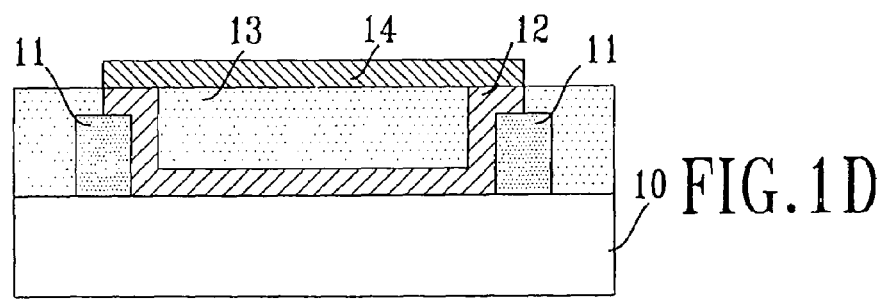

With reference to FIG. 1D, a second conductive optical film (14) is formed on the spacing layer (13) and between the adjacent supporting layers (11).

Figure 1E:
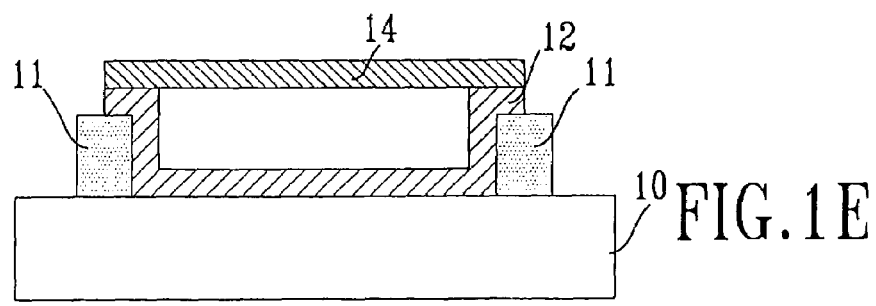

In FIG. 1E, the spacing layer (12) is removed from the substrate (10), whereby the second conductive optical film (14) is sustained by the adjacent supporting layers (11) via the first conductive optical film stack (12), and a gap is defined between the first and the second conductive optical film stacks (12)(13). The structure shown in FIG. 1E is also called an optical interference regulator.

In the foregoing process, the supporting layer (11) forming is accomplished by usual exposing and photolithography steps without involving a back-side exposing technology.

Figure 2A:
FIGS. 2A–2D show different embodiments of the first conductive optical film stacks.

With reference to FIGS. 2A–2D, said first conductive optical film stack (12) may be formed by different embodiments. In FIG. 2A, the first conductive optical film stack (12) is sequentially composed of a transparent conductive layer (121), an absorption layer (122a) and a dielectric layer (124a) according to a sequence from the bottom to the top.

Figure 2C:
Figure 2B:
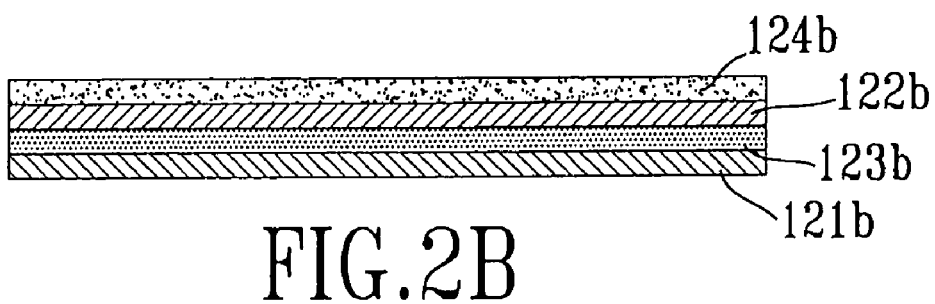

As shown in FIG. 2B, the first conductive optical film stack (12) is sequentially composed of a transparent conductive layer (121b), a first dielectric layer (123b), an absorption layer (122b) and a second dielectric layer (124b).

As shown in FIG. 2C, the first conductive optical film stack (12) is sequentially composed of a first dielectric layer (123c), a transparent conductive layer (121), an absorption layer (122bc) and a second dielectric layer (124c).

Figure 2D:
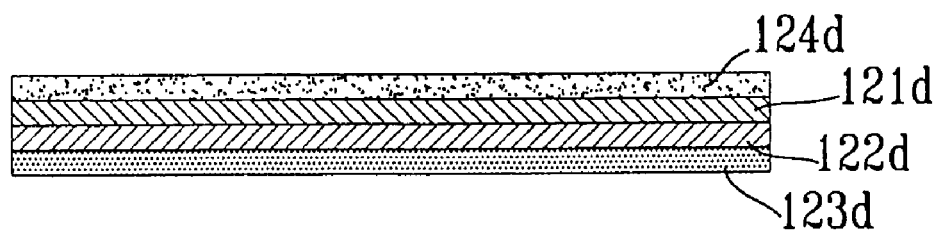
Figure 3:
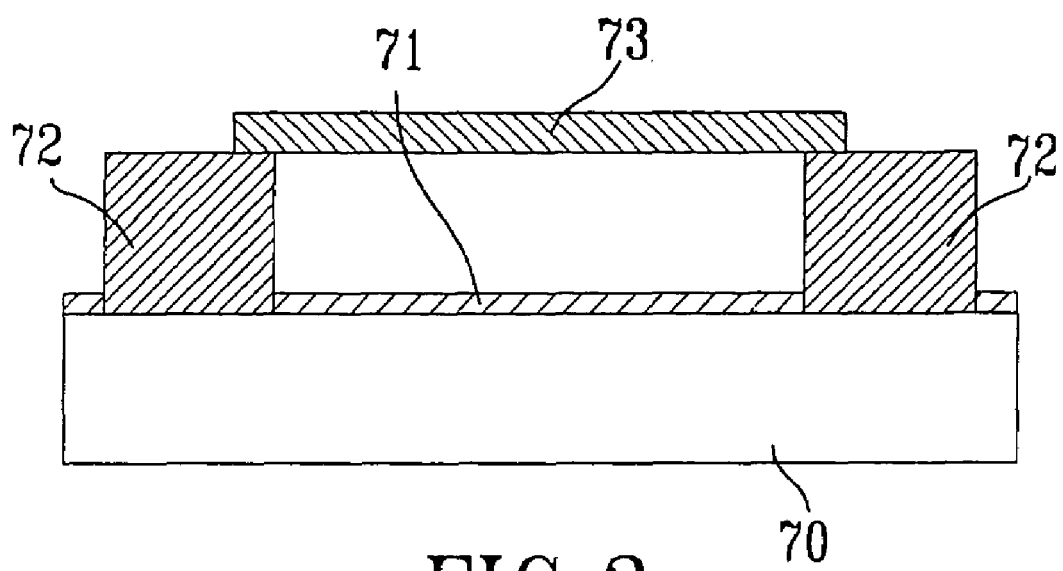
FIG. 3 is a cross sectional view of a single pixel of a convention optical-interference panel.
Figure 4A:
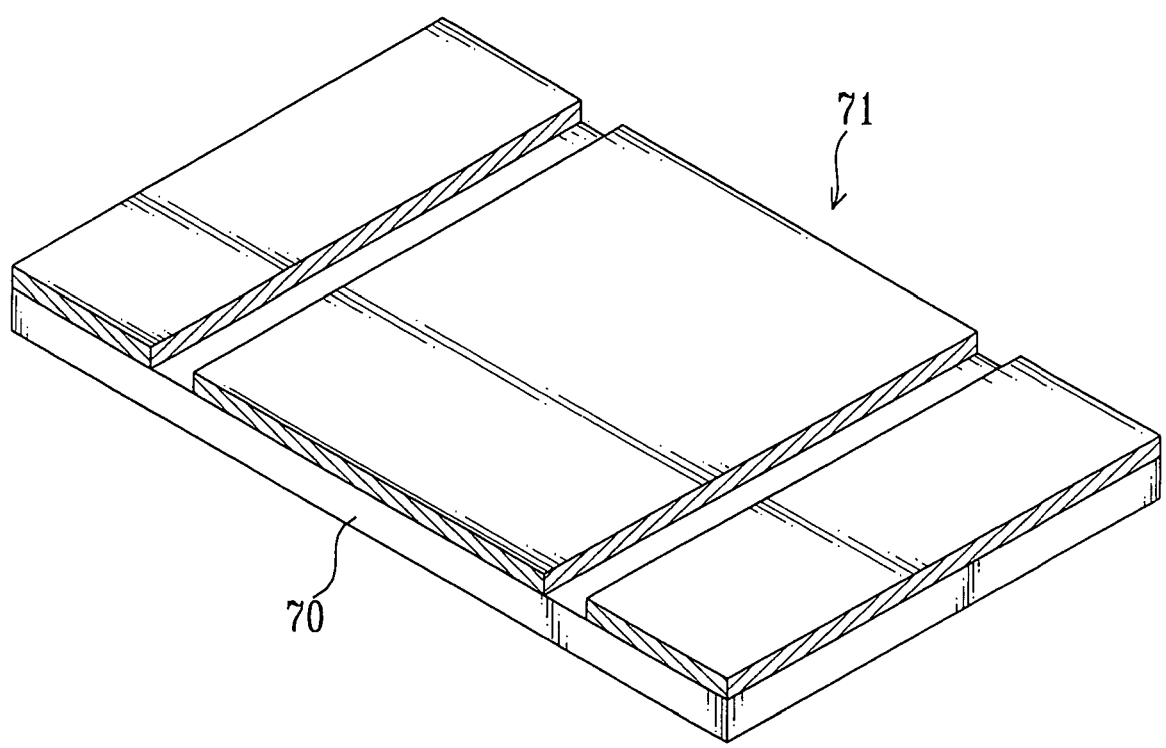
FIGS. 4A–4E show a conventional manufacturing process of the pixel of FIG. 3.
Figure 4B:
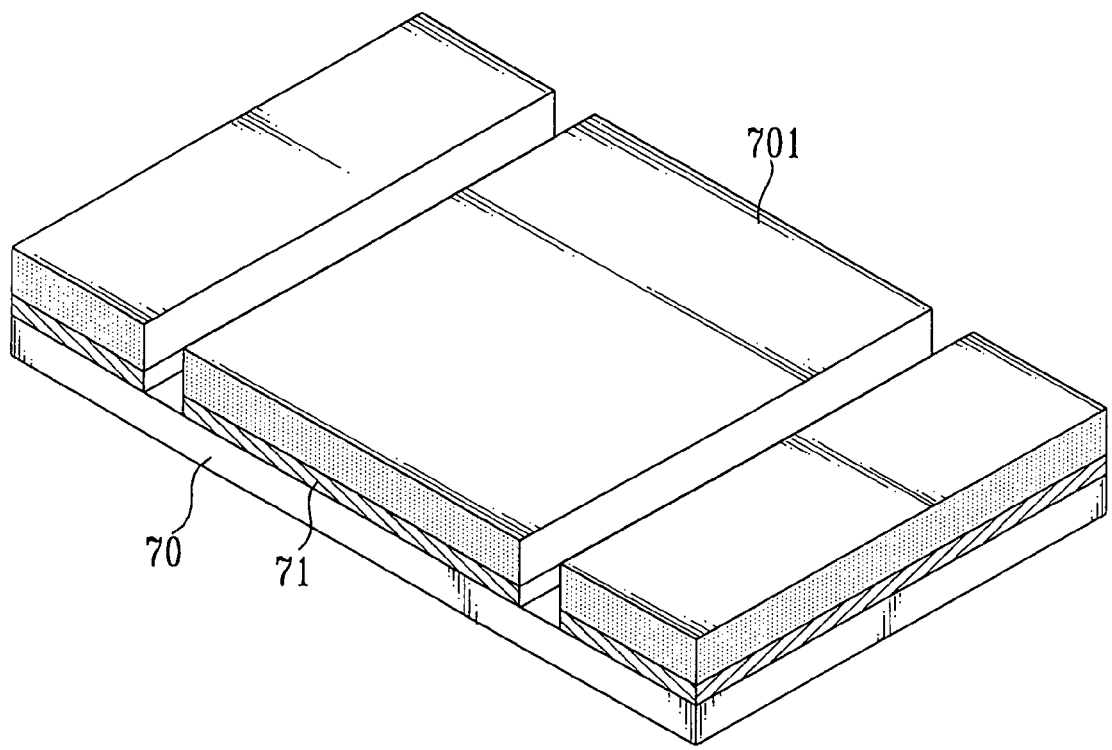
Figure 4C:
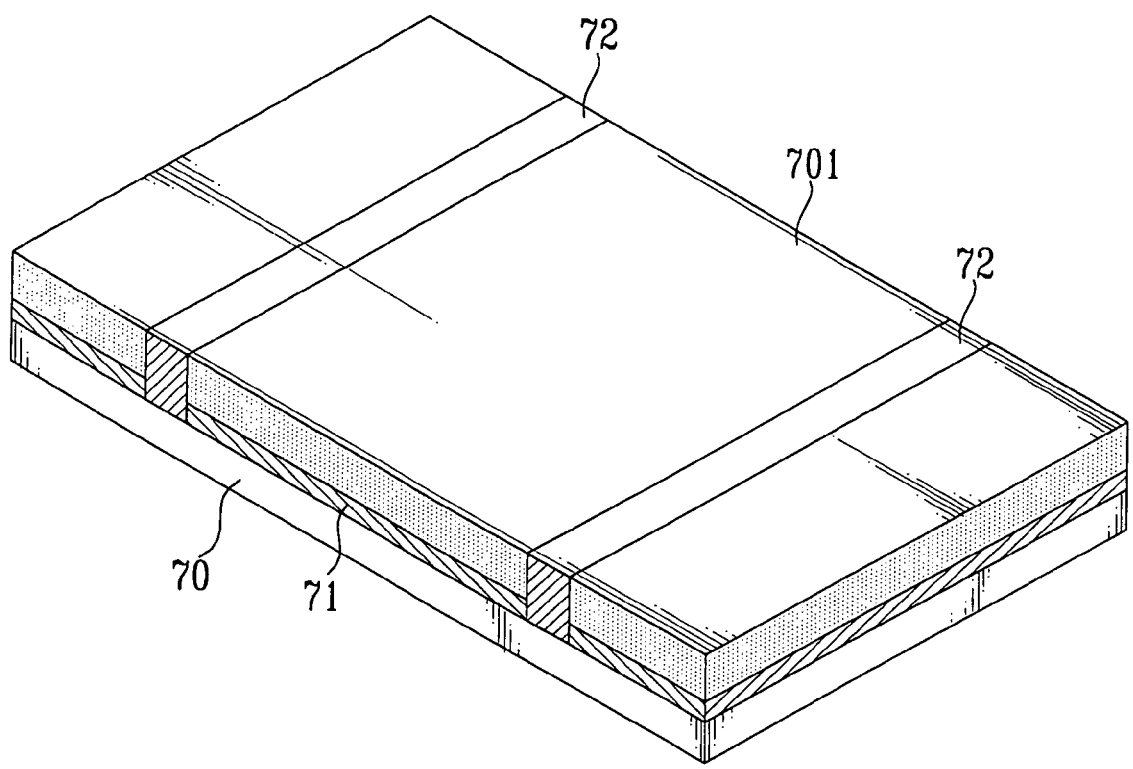
Figure 4D:
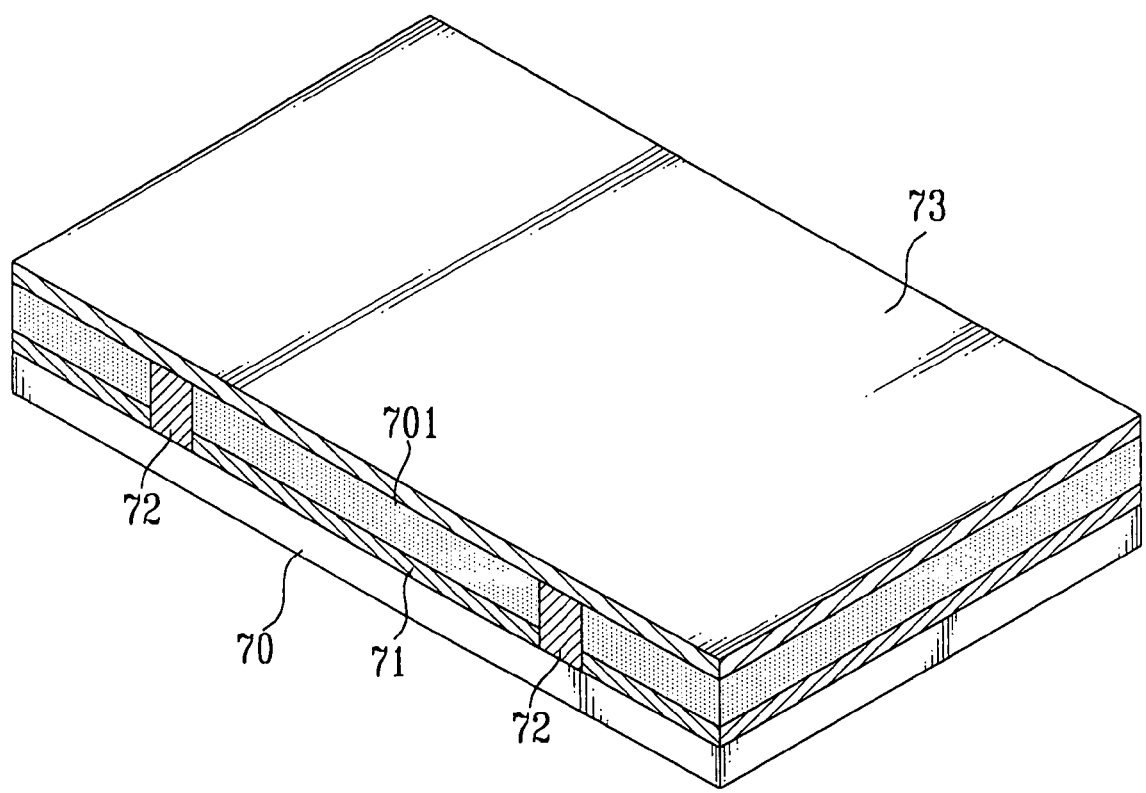
Figure 4E:
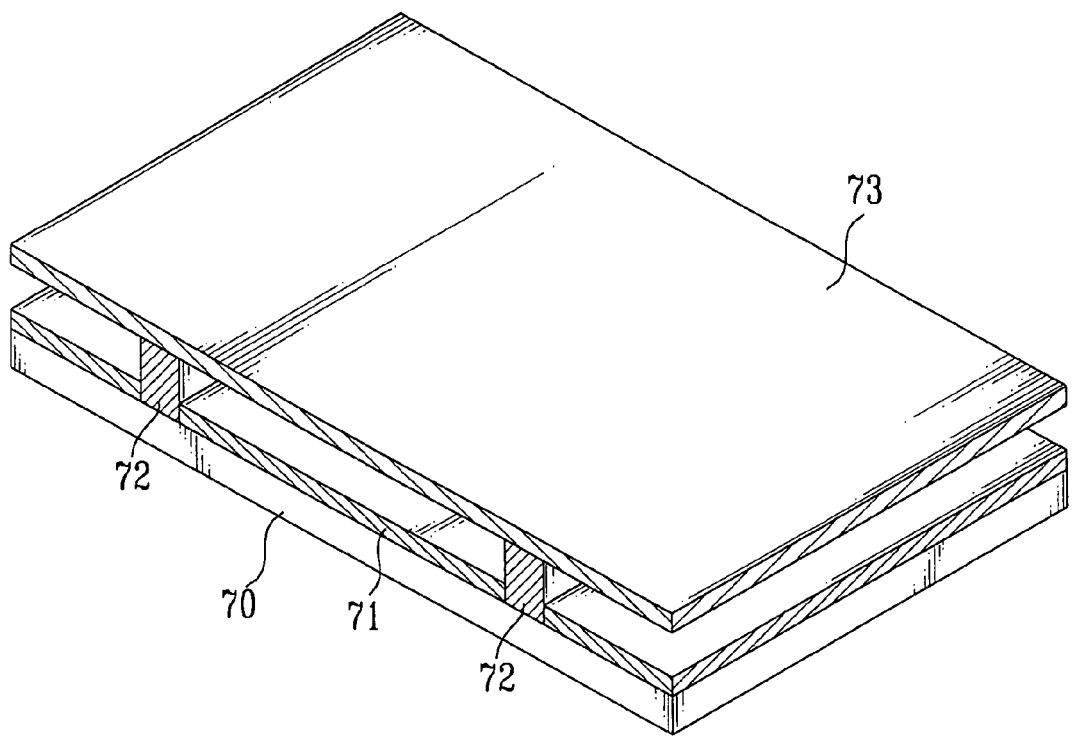

As shown in FIG. 2D, the first conductive optical film stack (12) is sequentially composed of a first dielectric layer (123d), an absorption layer (122d), a transparent conductive layer (121d) and a second dielectric layer (124d). Further, at least one optical reflective layer is composed in the second conductive optical film stack (14).

Since the manufacturing process of the present invention does not need a precise alignment step, the supporting layers (11) are partly overlapped by the first conductive optical film stack (12). Thus, said second conductive optical film stack (14) is accordingly formed above the first conductive optical film stack (12).

With the foregoing description, the panel manufacturing procedure is simplified because the precise alignment step is not required any more. Accordingly, the producing efficiency is able to be improved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical interference reflective panel comprising:
   a substrate (10);
   a plurality of supporting layers (11) formed on the substrate (10);
   a plurality of first conductive optical film stacks (12) formed on the substrate (10), wherein each first conductive optical film stack (12) is formed between adjacent supporting layers (11) and covers a part of the adjacent supporting layers (11); and
   a plurality of second conductive optical film stacks (14) formed above the first conductive optical film stacks (12), wherein the second conductive optical film stacks (14) partly overlap regions where the first conductive optical film stacks (12) are formed above the adjacent supporting layers (11).

2. The reflective panel as claimed in claim 1, wherein the substrate (10) is composed of glass or macromolecule material.

3. The reflective panel as claimed in claim 1, wherein the first conductive optical film stack (12) is composed of a transparent conductive layer (121), an absorption layer (122) and at least one dielectric layer (124).

4. The reflective panel as claimed in claim 1, wherein the second conductive optical film stack (14) contains at least one optical reflective layer therein.

* * * * *

UNITED STATES PATENT AND TRADEMARK OFFICE
CERTIFICATE OF CORRECTION

PATENT NO. : 6,999,236 B2  
APPLICATION NO. : 10/752811  
DATED : February 11, 2006  
INVENTOR(S) : Lin et al.

Page 1 of 1

It is certified that error appears in the above-identified patent and that said Letters Patent is hereby corrected as shown below:

At column 1, line 53, delete "amechanical" and insert --a mechanical-- therefor.

Signed and Sealed this

Twenty-ninth Day of August, 2006

JON W. DUDAS  
*Director of the United States Patent and Trademark Office*

UNITED STATES PATENT AND TRADEMARK OFFICE
CERTIFICATE OF CORRECTION

PATENT NO. : 6,999,236 B2  Page 1 of 1
APPLICATION NO. : 10/752811
DATED : February 14, 2006
INVENTOR(S) : Lin et al.

It is certified that error appears in the above-identified patent and that said Letters Patent is hereby corrected as shown below:

At column 1, line 53, delete "amechanical" and insert --a mechanical-- therefor.

This certificate supersedes Certificate of Correction issued August 29, 2006.

Signed and Sealed this

Seventh Day of November, 2006

JON W. DUDAS
*Director of the United States Patent and Trademark Office*